ary of a room, and in addition to pro-

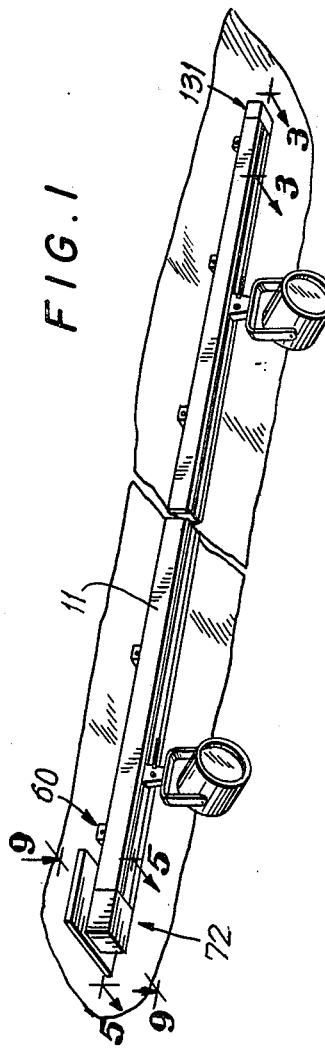
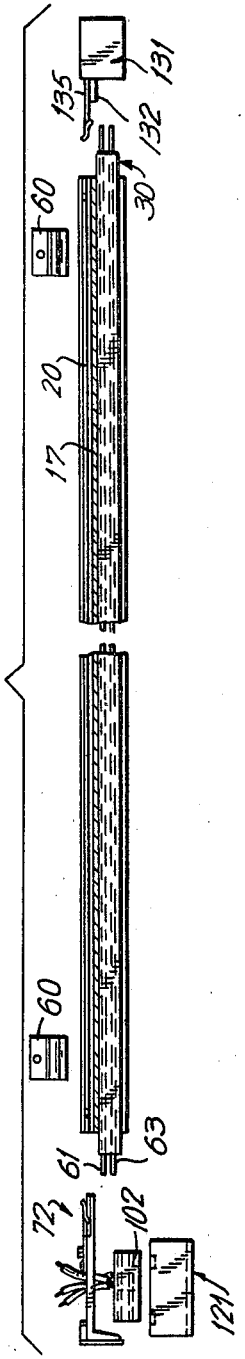
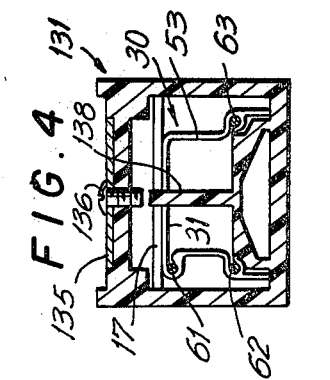
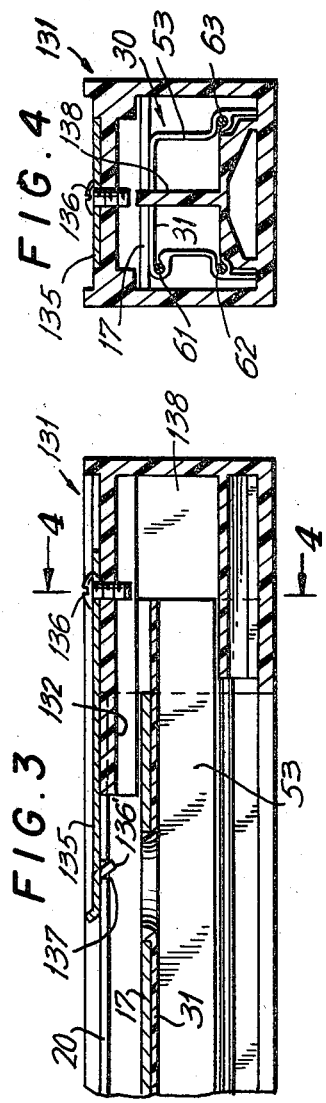
INVENTORS
MANFRED NEUMANN
ANTHONY DONATO
ATTORNEY

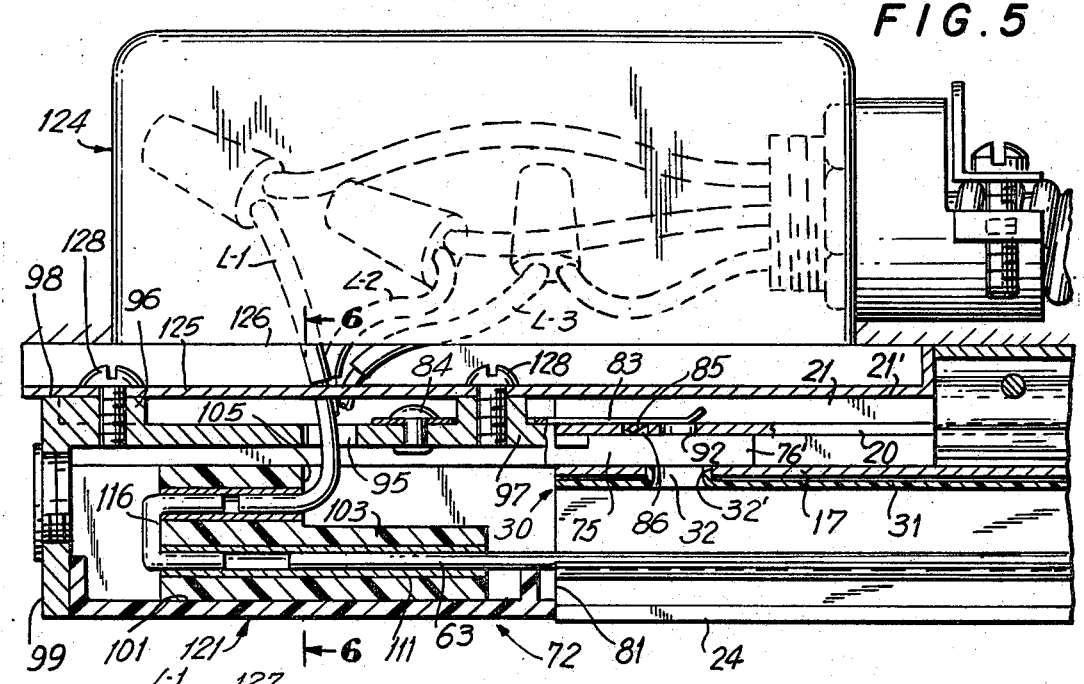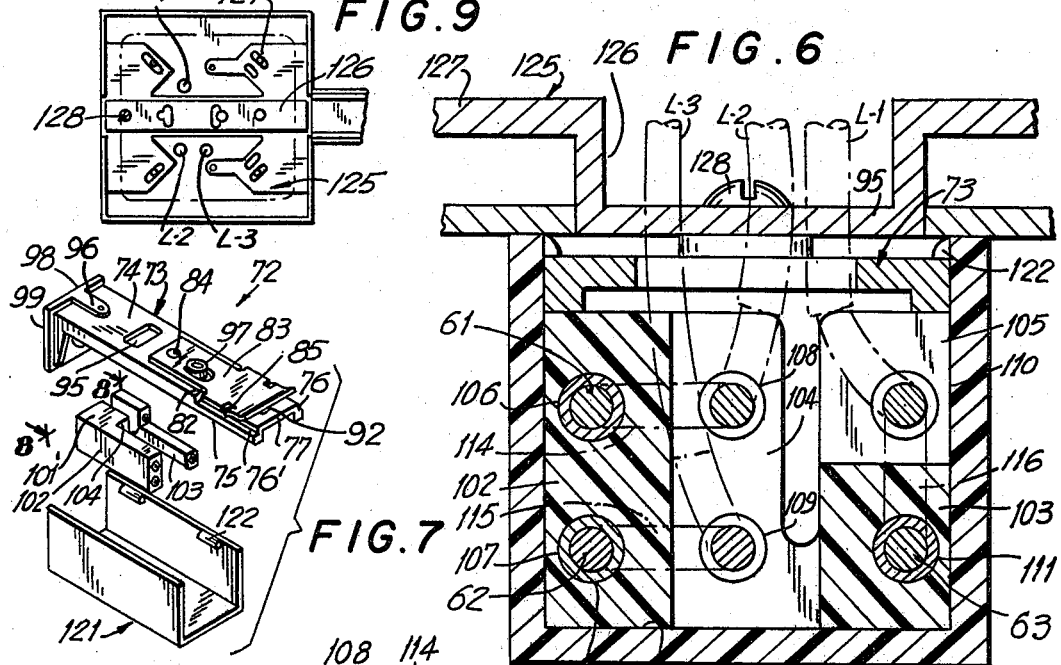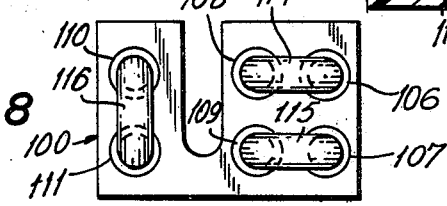

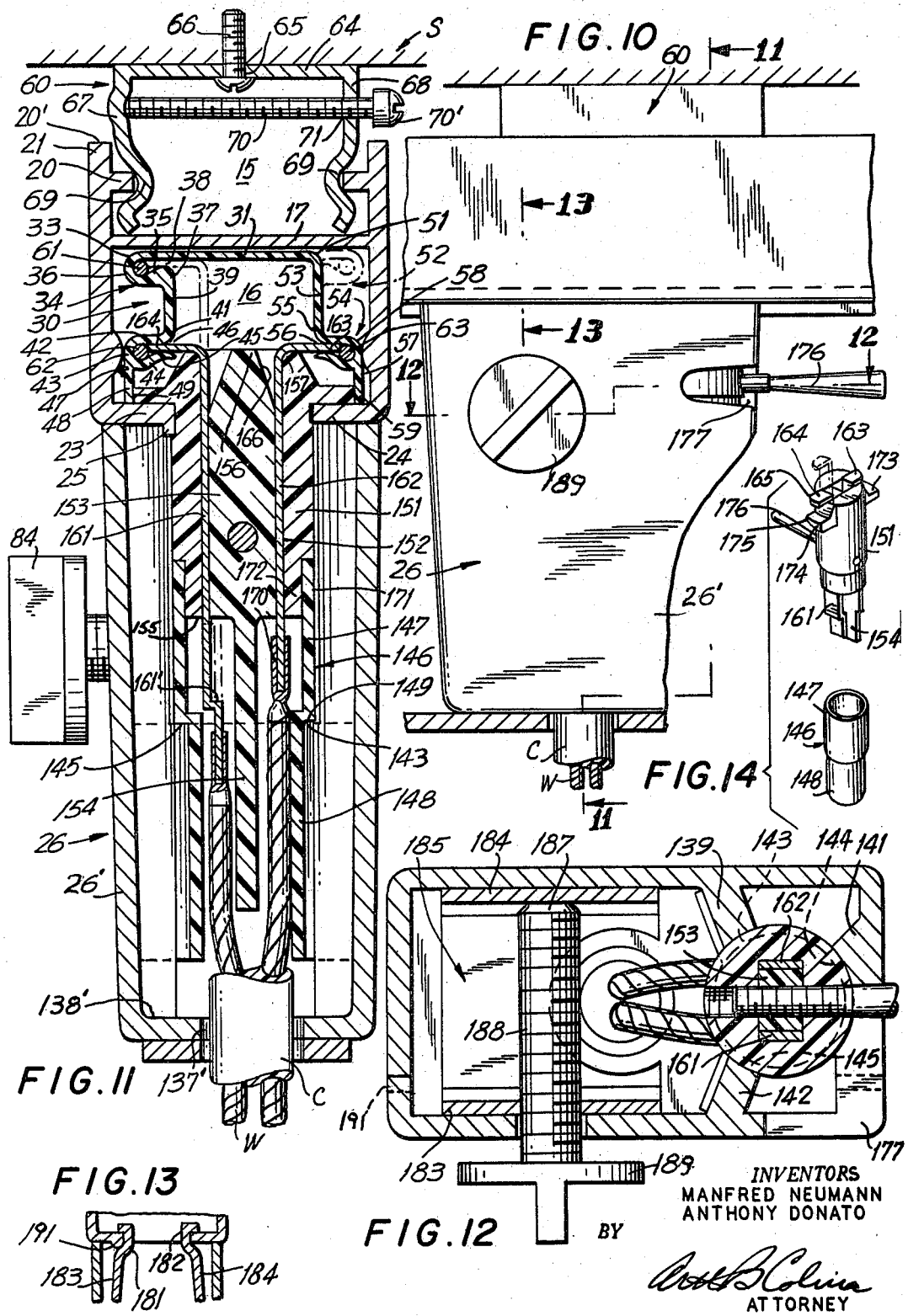

United States Patent Office 3,496,518
Patented Feb. 17, 1970

3,496,518
ELECTRICAL POWER DISTRIBUTION SYSTEMS
Manfred Neumann, River Edge, and Anthony Donato, Woodridge, N.J., assignors to Lightolier Incorporated, New York, N.Y., a corporation of New York
Filed Mar. 15, 1968, Ser. No. 713,425
Int. Cl. H01r 9/04, 13/50, 29/00
U.S. Cl. 339—21                 5 Claims

ABSTRACT OF THE DISCLOSURE

This invention relates to the art of electrical power distribution systems of the type utilizing a power distribution track having a flanged channel in which electric conductors are positioned and more particularly to a system employing a track carrying at least three conductors extending the length thereof and defining two separate electric circuits and an associated connector member which maybe mechanically connected to the track and which may be preset selectively to provide an electrical connection between either of the two electric circuits and an associated electric equipment to be energized.

---

As conducive to an understanding of the invention, it is noted that conventional electrical receptacles positioned at a fixed location within any given area to provide means for connecting electrical equipment to the available power supply, often limit the range of movement of the equipment connected thereto unless long connecting wires are used, and such wires are likely to become entangled and may possibly be severed if used in a factory, for example, where movable vehicles are employed, with resultant safety hazard.

Furthermore, where it is desired to provide illumination of different areas of a room as by means of spot lights, unless an electrical receptacle is available adjacent the location where the illumination is desired, any excessive distance between the area to be illuminated and the source of light would detract from the effect of the spot light and also illuminate undesired areas.

Where a power distribution system includes a track which permits selective connection thereto of electrical equipment, at any point along the length of the track by means of a connector member which engaged two conductors carried by the track and the conductors are electrically connected to a conventional source of power, say a 120 volt or 240 volt line which is fused at say 20 amperes, the current carrying capacity of the conductors and hence the number of electrical equipments that can be connected thereto, is limited by the current capacity of the pair of conductors of the track.

Where a large number of electrical units are required in a given area and which exceeds the current capacity of the power line to which any one track is connected, the provision of a completely separate and distinct track connected to a different power line which is separately fused, adds greatly to the cost of installation and often is relatively clumsy in appearance.

Where it is desired to be able to cut down the amount of illumination provided by a number of lighting fixtures connected to a single track, which in turn is connected to a single power line, this cannot be accomplished where the track has merely two conductors without having separate switching arrangements associated with each of the fixtures.

Furthermore, in many cases where different types of lighting effects are desired, such as by mixing of two colored lights, difficulties are encountered with a two conductor system.

It is accordingly among the objects of the invention to provide an electrical power distribution system including a conductor carrying track which may readily be mounted to provide a source of electrical power adjacent any desired region of a room, and in addition to providing such electrical power, will also support electrical equipment and permit selective connection of such equipment at substantially any portion thereof, eliminating the need for long connecting wires between the equipment and the power supply, and which will provide at least two separate and distinct circuits in one and the same track for electrical connection of the electric equipment to either of the circuits so that by appropriate switching either or both of the circuits may be energized for energization of the associated electric equipment and by reason of the plurality of circuits provided by a single track, the current carrying capacity and hence the number of electrical units connected thereto may be correspondingly increased.

According to the invention, these and other objects which will become hereafter apparent, are achieved by forming an elongated track member having two opposed substantially U-shaped channels having a common partition or wall. One of these channels functions as the supporting channel for the assembly, while the other channel serves to carry the electric conductors and as a support for the equipment.

The supporting channel is formed with inturned flanges, which in the illustrative embodiment shown are adapted to be engaged by supporting clips which have been previously secured to the surface along which the track member is to be extended.

The conductor carrying channel is also formed with inturned flanges which are at the free end of the legs thereof. Positioned in the channel is an elongated insulating strip formed with a base portion and a pair of side walls, the free ends of which react against the flanges and bias the base portion of the insulated strip against the partition wall. Electrical conductor retaining sheaths are formed integrally with the insulating strip and extend longitudinally thereof along its entire length. The sheaths are defined by reversely bent parallel wall portions with the outer edge of the sheath being closed, and the inner edge of the sheath defining a narrow longitudinal access opening.

Positioned in each of the sheaths adjacent the closed end thereof is a conductor member which extends the length of the associated sheath, and to which access is afforded only in a plane substantially parallel to the plane of the base portion.

Illustratively, at least one conductor carrying sheath is provided on one of the side walls of the strip adjacent one of the longitudinal edges of the base thereof and a conductor carrying sheath is provided on each of the walls of the strip adjacent to, but inwardly spaced from the free ends of such walls. Thus, each of the two conductors in the pair of sheaths associated with one of the walls of the strip together with the conductor in the sheath associated with the other wall of the strip will form a separate and distinct two-wire circuit.

To connect the electrical equipment to either of such two circuits carried by the track, a connector member is provided which has a housing within which an insulated body member is rotatably mounted. The body member is formed with conductor strips having laterally extending contact fingers which may selectively be moved into and out of electrical contact with the conductors of the power distribution track. At least one of the conductors is longitudinally movable in the body member so that it may selectively be preset to either of two positions in order to engage either one of the two conductors associated with with the same wall of the insulating strip, whereby one of the two circuits may be selected by each connector member.

Also provided in the housing are locking configurations in the form of flange engaging jaws adapted mechanically to lock the connector housing with respect to the power distribution track. The locking configurations are such that they may be adjusted to permit sliding of the housing along the track without disengagement therefrom and locking of the housing in fixed position with respect to any desired position along the track.

In the accompanying drawings in which are shown one or more of various possible embodiments of the several features of the invention, FIG. 1 is a perspective view of the power distribution system as utilized to support and energize a lighting fixture, FIG. 2 is an exploded view in elevation and partly in cross section, with parts broken away indicating the structural components of the power distribution system shown in FIG. 1, FIG. 3 is an enlarged sectional detail view taken along line 3—3 of FIG. 1 showing an end cap for closing off an end of the track, FIG. 4 is a sectional view taken along line 4—4 of FIG. 3, FIG. 5 is an enlarged cross sectional view taken along line 5—5 of FIG. 1 showing how the power distribution system is connected to a power source such as a conventional junction box, FIG. 6 is a transverse sectional view taken along line 6—6 of FIG. 5 illustrating the connection between the conductors and the power supply, FIG. 7 is an exploded perspective view of a track end mounting connector assembly, FIG. 8 is an end view of the connector block taken along line 8—8 of FIG. 4, FIG. 9 is an enlarged detail view taken along line 9—9 of FIG. 1 illustrating the mounting support plate used in effecting a connection to the junction box of the power supply, FIG. 10 is an enlarged side elevational view of a connector member adapted for use between the power distribution track and the electrical equipment illustratively shown on a lighting fixture in FIG. 1, FIG. 11 is a sectional view taken along line 11—11 of FIG. 10 showing the details of the connector member, FIG. 12 is a sectional view taken along line 12—12 of FIG. 10, FIG. 13 is a detail sectional view of the clamp jaws of the connector member, and FIG. 14 is an exploded perspective view of a portion of the connector member.

Referring now to the drawings, in the illustrative embodiment of the invention, shown in FIGS. 1 and 2, the power distribution system comprises an elongated track 11 preferably formed of extruded aluminum. It is preferred to form the track of basic four foot and eight foot modules thereby facilitating its installation in conventional building structures. Although the track 11 is illustratively shown installed on a ceiling to provide overhead lighting, it can of course be positioned on any desired wall surface.

As best shown in FIG. 11, the track 11 is formed with two opposed substantially U-shaped channels 15 and 16, spaced by a common partition or wall 17. The channel 15 is formed with inturned spaced flanges 20 positioned below the upper edges 20' of the legs of the channel so as to provide skirts 21 extending above flanges 20. The channel 16 is formed with inturned spaced flanges 23 and 24 at the free ends of the legs thereof. Flange 23 is provided with a longitudinally extending depending bead 25 affording desired positioning of a connector member 26 on the track 11 as will be hereinafter described.

Positioned in channel 16 is an elongated strip 30 substantially U-shaped in cross section and desirably extruded from suitable plastic such as polyvinyl chloride or the like.

The strip 30 has a base 31 adapted to lie against and be secured to partition or wall 17 by thermally upsetting portions of base 31 and at 32' into adjacent recesses 32 in wall 17 as shown in FIG. 5.

Extending longitudinally of the base 31 adjacent the side edge 33 thereof and formed integral therewith is an elongated sheath 34, which has a reversely bent portion 35 extending inwardly from the closed end 36 of the sheath and which extends substantially parallel to the base, being slightly spaced therefrom at its inner end 37 to define a narrow elongated opening 38.

Depending from the inner end 37 of portion 35 of sheath 34 is a separator wall 39, the lower end 41 of which has an outwardly extending portion 42 which is reversely bent as at 43 and then extends inwardly to define a bottom wall portion 44 substantially parallel to the portion 42 with the free end 45 of portion 44 being slightly spaced from the end 41 of wall 39 to define a narrow elongated opening 46.

The sheath 47 thus formed, extends parallel to sheath 34 and a spacer wall 48 depends from the reversely bent end 43 of sheath 47 with the lower ends 49 of wall 48 abutting against flange 23.

The side edge 51 of base 31 may have a sheath 52 shown in broken lines, formed integral therewith similar to sheath 34. However, in the illustrative embodiment shown, a separator wall 53 is provided depending from said edge 51 and extending parallel to wall 39. A sheath 54 identical to sheath 47 is formed at the lower end 55 of wall 53 with the narrow elongated opening 56 of sheath 54 being transversely aligned with the opening 46 of sheath 47. In addition, a spacer wall 57 depends from the closed end 58 of sheath 54 with the lower end 59 of wall 57 abutting against flange 24, said spacer walls 48 and 57 serving to bias the base 31 of strip 30 against wall 17.

Extending through each of the sheaths 34, 47 and 54 and positioned adjacent each of the closed ends thereof are conductor wires 61, 62 and 63 respectively, the conductor 63 being common to two separate and distinct circuits formed by each of the conductors 61 and 62 in combination with said conductor 63. By reason of the fact that the conductors are located at the closed or root ends of the sheaths and spaced from the associated openings leading into the sheath, access to the conductors is limited only along a plane parallel to the surface of base 31 whereby inadvertent contact with the conductors is prevented.

Mounting of the track 11 with respect to any desired surface is effected by means of supporting spring clips 60 as best shown in FIGS. 1, 2 and 11. Clips 60 are formed with a base portion 64 having central apertures 65 adapted to accommodate a fastening member 66 such as a screw, bolt, rivet or the like, serving to anchor the clip 60 with respect to a supporting surface S. It will be noted that the clip base 64 is adapted to lie flush against supporting surface S. Extending from base 61 are legs 67, 68, each formed respectively with an indent 69, within which flanges 20 of supporting channel 15 of track 11 may be engaged.

A screw 70 having a slotted head 70', passes in threaded engagement through a tapped aperture 71 in legs 68 while the free end of screw 70 contacts leg 67 so that upon turning of screw 70 to move it toward leg 67, legs 67, 68 are separated to insure secure engagement of the flanges 20 on the track 11.

In order to effect the connection between the conductors 61, 62 and 63 of the power distribution track with the available power supply, a track end mounting connector assembly 72 is provided as shown in FIGS. 1 and 2 and illustrated in greater detail in FIGS. 5–9.

Connector assembly 72 comprises a track end closure component 73 having a body portion 74 and a nose portion 75 which has longitudinal grooves 76 along each side edge thereof to define lateral fins 76' with a reduced portion 77 between such fins 76'. The thickness of the fins 76' is slightly less than the distance between the top wall 17 and flanges 20 so that said nose portion may be slid beneath flanges 20 into channel 15 as shown in FIG. 5 until the end 81 of the channel abuts against the shoulder 82 at the root end of the grooves 76.

In order releasably to lock the connector assembly 72 to the end of track 11, a locking plate 83 formed of spring steel or the like is riveted at 84 to body portion 74 (FIGS. 5 and 7). Plate 83 extends longitudinally of body portion 74 over the nose portion 75 thereof, said plate 83 having downwardly bent lugs 85 on each side thereof adjacent its free end adapted to snap into openings 86 in flanges 20 when the connector assembly is moved into the track as above described, releasably to retain the connector assembly to the end of the track.

A slot or opening 92 is formed in end portion 75 aligned with opening 32, 32' in the wall 17 and the base 31 to permit insertion therethrough of the tip of a screwdriver or the like to force the plate 83 upwardly away from the flanges 20 to release the lugs 85 from engagement with notches 86 when it is desired to effect removal of the track and connector assembly from beneath the track.

Body portion 74 is formed with a conductor aperture 95 as shown in FIGS. 5 and 7 through which the conductor leads L–1, L–2, L–3 necessary to effect connection to the three conductors 61, 62, 63 of the power distribution strip 31 may be extended.

Threaded bushings 96, 97 are formed integrally with the body portion 74 and of height such as to have their upper surfaces flush with the top edge 98 of front plate 99 of the connector assembly 74, which top edge 98 will also be in the same plane as the upper edge 20' of the skirt 21.

Positioned beneath body portion 73 is a connector block 100 as shown in FIGS. 5–8.

Connector block 100 is desirably formed of a suitable insulating plastic material and is of thickness such that when positioned beneath body portion 73, the lower edge 101 of the connector block 100 will lie in a plane slightly above the lower edge 102 of front plate 99.

Connector block 100 as shown in FIGS. 6 and 7, illustratively has a substantially block-shaped end portion 101' from which two parallel legs 102 and 103 extend, defining an inner wall surface 104 at the root ends of the legs. One of the legs, illustratively the leg 103 is approximately one-half the height of the other leg 102 to define a wall surface 105 in the same vertical plane as wall surface 104.

Extending through the leg 102, the wall surface 104 and the aligned wall surface 105 and leg 103 are three pairs of vertically aligned bores 106, 107, 108, 109 and 110, 111 which also extend through the block-shaped end portion 101'. Each of the bores mounts a conducting sleeve 112, the function of which will be hereinafter described.

As shown in FIG. 6, the common conductor 63 is designed to be inserted into the portion of sleeve 112 extending through bore 111 of leg 103 and the conductors 61, 62 are designed to be inserted into the portions of sleeves 112 extending through the vertically aligned bores 106, 107 of leg 102. Thus, the connector block provides a releasable connection of conductors 61, 62, 63 to the sleeves 112 retained in the block.

To provide electric connection between the sleeves 112 in bores 106, 108; 109 and 110, 111, jumper wires 114, 115 and 116 are inserted into the ends of the sleeves exposed at the rear of the block 101 as shown in FIG. 8.

A cover 121 preferably of plastic, and U-shaped in cross section, is positioned over the connector block 100 and secured to the body portion 73 by means of detents 122 carried by the free ends of the legs of the housing and which snap over the top of body portions 73 to provide releasable retention of the cover member as shown in FIG. 6.

In order to secure the track end mounting assembly 72 to the junction box 124 (FIG. 5), a mounting plate 125 is provided as shown in FIG. 9. Mounting plate 125 is formed with a channel 126 at the center thereof between its wings 127. Channel 126 is secured to closure 73 by means of screws 128 extending into tapped bushings 96, 97 as shown in FIG. 5.

The wings 127 of mounting plate 125 are secured to the attachment plate of the junction box 124 in usual manner, well known in the art.

The power leads L–1, L–2, L–3 from the junction box 124 are fed through opening 95 in closure 73 and pushed respectively into the ends of sleeves 112 extending through bores 110 and 108, 109 exposed at the surfaces 105, 104 respectively of the connector block, the lead L–1 being common and the leads L–2, L–3 each providing a separate 110 volt circuit with respect to common lead L–1 in the illustrative embodiment herein.

Closure of the end of track 11 remote from its power connection end is accomplished by means of a track end closure assembly 131 as shown to the right in FIGS. 1 and 2 and in FIGS. 3 and 4. The track end closure assembly 131 is of a block-like configuration having a cross sectional dimension substantially like that of the exterior of the track so that when the assembly 131 is in position with respect to the track, a desired smoothness of contour will be attained.

The end closure assembly 131 preferably is molded of thermosetting plastic material and has a forwardly projecting nose portion 132, with lateral grooves similar to the grooves 76 shown in FIG. 7 so that said nose portion may fit between the opposed flanges 20 of the track with the fins defined by the grooves positioned beneath the flanges 20. A spring leaf member 135 is secured to the top of the block formation as by a screw 136 and extends over the nose portion thereof. The leaf member 135 has downwardly projecting transversely aligned fingers 136' adapted to snap into apertures 137 in the flanges 20 releasably to retain the end assembly in position. The interior of the end assembly is hollow and has a central partition 138 interposed between the common conductor 63 and the conductors 61, 62. Thus, when the end assembly 131 is secured in position, the exposed ends of the conductors will be completely shielded.

The connector member 26 previously mentioned, serves to effect a connection between the electrical equipment and the power distribution track 11.

The connector member 26 is formed with a box-like housing 26', rectangular in cross section as illustrated in FIG. 2 and slightly tapered in elevation as shown in FIG. 10, the walls of said housing extending in planes at substantially right angles to each other. Housing 26' is preferably die cast and has an aperture 137' in its bottom wall 138' through which a power cord C may be extended. The housing is formed with interior ribs 139, 141 and 142 as shown in FIG. 12. Positioned for rotation on seats 143, 144 and 145, formed in the ribs, is a sleeve member 146 having an upper portion 147 of relatively larger diameter than the lower portion 148 and defining an annular shoulder 149 which rests on said seats.

Sleeve 146 accommodates a plug body 151 which is of a cylindrical configuration and is formed of insulating material. The plug body has an axial bore 152 therethrough in which is positioned a plug insert 153, the bore 152 and insert 153 both being rectangular in cross section. The insert 153 has a substantially rectangular spacer plate 154 extending longitudinally from its outer end 155 and the insert 153 is desirably of length such that the nose end 156 thereof is flush with the nose end 157 of plug 151.

Extending through the bore 152 of the plug 151 is a pair of conducting strips 161 and 162 which are securely retained in the plug 151 by the insert 153 which clamps the strips against the bore wall of the plug. However, although the strips are securely retained, the strip 161 is able to be moved from its innermost position shown in solid line in FIG. 11 to its outermost position shown in broken lines in FIG. 11. The inner ends of the strips 161 and 162 are bent outwardly at right angles to the length thereof so that they extend past the nose end 157 of the plug and define contact fingers 163 and 164, the uper left hand corner of finger 164 and the lower right hand corner of finger 163 being beveled at 165 as is clearly shown in FIG. 14. To permit inward displacement of the contact fingers 163 and 164 when they engage the conductors, the nose end 156 of the insert is desirably beveled as at 166 to afford clearance for the root ends of the contact fingers.

The sleeve 146 which is of insulating material, shields the ends 170 of the conducting strips 161 and 162 to which the ends of the electric wires W in cord C are connected. The inner end 171 of sleeve 146 is desirably retained by force fit on an inner peripheral shoulder 172 at the end of the plug. The strip 161 has an abutment 161′ at its rear end adapted to abut against plug 151 to limit inward movement of strip 161.

Aligned with the contact fingers 163 and 164 and extending laterally outward from the plug 151 are diametrically opposed locking flanges 173 and 174 positioned near the nose end of the plug. The upper left hand corner and the lower right hand corner of the locking flanges are beveled as at 175 as clearly shown in FIG. 14.

The distance between the ends of the contact fingers 163 and 164 is substantially equal to the distance between the conductors 62 and 63 as measured from their facing surfaces as best shown in FIG. 11.

A handle 176 extends through slot 177 in housing 26′ into threaded engagement with plug body 151 as best shown in FIG. 12. Slot 177 extends from a side surface to the front surface of the housing 26′ as shown in FIG. 12 thus permitting rotation of plug body member 151 through 90 degrees.

Mechanical coupling of the connector plug housing 26′ to the track 111 is effected by means of concave jaws 181, 182 on the upper end of the legs 183 and 184 respectively of a U-shaped locking member 185. Leg 184 is contacted by the nose 187 of screw 188 extending through a threaded opening in leg 183, said screw being formed with knob 189 arranged externally of housing 26′, as best shown in FIGS. 11 and 12.

In order to effect a connection between connector housing 26′ and track 111, to insure that the finger 163 will engage the common conductor 63, housing 26′ is formed with a notch 191 in its upper edge as best shown in FIGS. 12 and 13 to insure proper indexing and orientation of the connector member 26 with respect to track 11.

In use of the above described connector member 26, the housing 26′ is positioned in proximity to flanges 23 and 24 of the track 111 with contact fingers 163, 164 and locking flanges 173, 174 extending longitudinally of channel 16 and with polarity notch 191 receiving the track bead 25, it being understood that the contact finger 163 is adapted for connection to conductor 63 by virtue of this alignment of bead 25 with notch 191.

Jaws 181 and 182 of connector member 26 are positioned between the opposed faces of track flanges 23 and 24 which fit into the concavity of such jaws. Thereafter, by turning knob 189, legs 183 and 184 are separated causing jaws 181 and 182 to grip the flanges 23 and 24 respectively, securely to lock the housing in fixed position with respect to the track.

Electrical connection is effected by thereupon moving the handle 176 through an arc of 90 degrees which will cause the contact fingers 164 and 163 to enter the openings 46, 56 of sheaths 47, 54 and wedge against the associated conductors 62 and 63. In addition, such movement will cause the ends of flanges 174 and 173 to wedge against the flanges 24 and 23. As a result, a positive electrical connection will be provided and since the flanges 173, 174 rest on the flanges of the track 11, there will be no vertical strain on the contact fingers.

It is noted that in the event the member 26 should be reversed and the bead 25 was not in alignment with notch 191, the member 26 would be inclined slightly by reason of the abutment of the uninterrupted edge of the plug against the bead. As a result, the locking flanges 173, 174 would abut against the inner edge of flanges 24 and 23 when an attempt was made to rotate the plug to provide electrical connection, so that such electrical connection could not be completed.

If it should be desired to break the electrical connection of the electrical equipment to the track 111, it is merely necessary to rotate the handle 176 through an arc of 90 degrees in the opposite direction. Where it is desired to move the connector plug to another position along the track, after the electrical contact has been broken as above described, it is merely necessary to turn screw 188 slightly so that the locking action of the jaws 181 and 182 against flanges 23 and 24 will be released, but with the jaws still in engagement with such flanges, and slide the connector plug to the new position and thereupon lock the plug in place by rotating the screw 188 in the opposite direction. At this time electrical connection can be afforded merely by moving handle 176 through an arc of 90 degrees.

As illustratively described, the contact fingers, when in the position shown in FIG. 11, will engage the conductors 62 and 63 to complete a circuit to the electrical equipment to be energized. Assuming that the number of electrical equipments to be connected to the track, each through an associated connector member 26, would exceed the current capacity of any one 120 volt line, for example, then in such case the power lines L–1, L–2 and L–3 would be connected to a three-wire main power circuit with the line L–1 being common to each of the lines L–2 and Y–3 and with 120 volts being provided between the line L–1, L–2 and the lines L–1 and L–3, each of the lines L–2 and L–3 being separately fused in conventional manner.

Thus, since the power leads L–1, L–2 and L–3 are connected to conductors 63, 61 and 62 respectively, it is apparent that a 120 volt circuit would be provided between conductors 62 and 63 and a separate 120 volt circuit will be provided between conductors 61 and 63.

Accordingly, it is merely necessary to have say, half of the electrical equipments connected to the conductors 62 and 63 and half connected to the conductors 61 and 63.

Consequently, it is merely necessary to retain the strip 161 in the position shown in full lines in FIG. 11, in half of the connector members 26 so that the contact fingers 164, 163 of such strips will engage the conductors 62, 63 and to pull out the strip 161 of the other half of the connector member 26 to move the contact finger 164 thereof to the position shown in broken lines in FIG. 11 so that it will engage the conductor 61.

As a result of this arrangement it is clear that with the same track and the same connector member, according to the invention herein, electrical equipments may be connected to two separate and distinct circuits.

Where it is desired to use a single 120 volt circuit and to connect either of the pairs of conductors 61, 63 or 62 and 63 to such 120 volt line, or to connect both of said pairs of conductors to said line, a simple switching arrangement can be employed so that either or both pairs of circuit carried by the track can be energized. As such switching arrangement would be obvious to one skilled in the art, it will not be described.

As a result of the arrangemnt herein shown, a two circuit power system is incorporated in a single track thereby providing great flexibility in use.

As many changes could be made in the above construction, and many apparently widely different embodiments of this invention could be made, it is intended that all matter contained in the above description or shown in the accompanying drawings shall be interpreted as illustrative and not in a limiting sense.

Having thus described our invention what we claim as new and desire to secure by Letters Patent of the United States is:

1. An electrical power distribution track and connector member comprising an elongated rigid member having a substantially U-shaped conductor carrying channel, said channel having a floor and a pair of opposed parallel legs, a flange extending inwardly from each of said legs, an elongated insulating strip within said conductor carrying channel and extending the length thereof, said strip being substantially U-shaped in cross section and comprising a base with a pair of spaced parallel side walls, at least one elongated sheath formed integral with one of said side walls and extending the length thereof, a pair of elongated sheaths formed integral with the other side wall and extending the length thereof, each of said sheaths lying in a plane substantially parallel to the plane of said base, each of said sheaths having an elongted longitudinal opening extending the length thereof to provide access into the associated sheath from the interior of the U-shaped strip, a conductor in each of said sheaths and extending the length thereof, each of said conductors being transversely spaced from the opening leading into the associated sheath, whereby the sheath prevents access to said conductor other than along a plane parallel to said base, said connector member comprising a housing, means releasably to connect said housing to the inwardly extending flanges of said conductor carrying channel, a body member of insulated material rotatably mounted in said housing, said body member having a nose end aligned with the interior of the U-shaped strip when the housing is secured to the flanges of said conductor carrying channel, a pair of diametrically opposed contact fingers extending laterally outward from the nose end of the body member, one of said contact fingers being positioned to lie in the same plane as the sheath integral with one of said side walls of said insulating strip when the housing is connected to said channel and the other of said contact fingers being longitudinally movable between two positions in which it will selectively lie in the same plane as either of the sheaths of said pair formed integral with the other side wall when the housing is connected to said channel, and means to rotate said body member to move the contact fingers carried thereby into engagement with the conductor positioned in the sheath lying in the same plane as the associated contact finger.

2. The combination set forth in claim 1 in which said conductor carrying channel is formed with a longitudinally extending bead and said conductor housing is formed with a notch engaging said bead to insure that said longitudinally movable contact finger is aligned with the side wall of said insulating strip having the pair of sheaths.

3. As an article of manufacture a connector member for use with a power distribution track of the type having a flanged channel with a substantially U-shaped insulating strip extending the length thereof, said strip having a base with a pair of side walls, one of said side walls having an elongated sheath extending the length thereof, and the other side wall having a pair of elongated sheaths extending the length thereof, each of said sheaths lying in a plane substantially parallel to the plane of said base and having a longitudinal opening on the inner end thereof and a conductor positioned in each of said sheaths at the outer end thereof and extending the length thereof, said connector member comprising a housing, a body member of insulated material rotatably mounted in said housing, said body member having a nose end normally protruding from one end of said housing and having a pair of diametrically opposed locking flanges extending laterally from said body member adjacent its nose end releasably to connect said housing to said channel, a pair of diametrically opposed contact fingers extending laterally outward from the nose end of the body member and aligned with and spaced from said locking flanges, one of said contact fingers being positioned to lie in the same plane as the sheath on one of said side walls of said insulating strip when said housing is connected to said channel, the other of said contact fingers being longitudinally movable between two positions, in which it is selectively aligned with the plane of one of the sheaths of said pair on the other side wall of said insulating strip when said housing is connected to said channel and means to rotate said body member and its associated locking flanges and contact fingers with respect to said housing to connect said housing to said conductor channel and to move said contact fingers into the sheaths with which they are aligned to engage the conductors in said sheaths.

4. As an article of manufacture a connector comprising a housing having a mouth, portions of which define a locking conformation, a plug rotatably mounted in said housing, said plug having a nose end normally protruding from one end of said housing and having a pair of diametrically opposed locking flanges extending laterally from said plug adjacent its nose end, said locking flanges and said locking conformations coacting with each other to effect a clamping action, a pair of diametrically opposed contact fingers extending laterally outward from the nose end of the plug and aligned with and spaced from said locking flanges, one of said contact fingers being retained in fixed position and the other of said contact fingers being longitudinally movable between two positions, and means to rotate said plug, the locking fingers and the contact fingers in unison with respect to said housing to move said locking flanges toward said locking conformation to effect such clamping action.

5. The combination set forth in claim 4 in which said plug has an axial bore therethrough, a pair of spaced parallel conducting strips extend through said axial bore and protrude beyond the nose end, said contact fingers extending laterally from the ends of said strips, and an insert in said bore between said contact strips securely to retain the latter in position in said bore, one of said contacts having an abutment adapted to engage said insert to limit the movement of said strip between its two positions.

References Cited

UNITED STATES PATENTS

| | | |
|---|---|---|
| 2,163,201 | 6/1939 | Kalencik. |
| 2,323,736 | 7/1943 | Tousley _____ 339—31 |
| 2,628,997 | 2/1953 | Salomone et al. |
| 2,977,566 | 3/1961 | Neumann et al. ____ 339—20 XR |
| 3,025,486 | 3/1962 | Falconer _____ 339—31 |
| 3,295,093 | 12/1966 | Neumann et al. _____ 339—21 |

RICHARD E. MOORE, Primary Examiner

PATRICK, A. CLIFFORD, Assistant Examiner

U.S. Cl. X.R.

339—31, 176